United States Patent [19]

Seki

[11] Patent Number: 5,121,201
[45] Date of Patent: Jun. 9, 1992

[54] METHOD AND APPARATUS FOR DETECTING THE NUMBER OF PERSONS

[75] Inventor: Hiroshi Seki, Matsudo, Japan

[73] Assignee: Daido Denki Kogyo Kabushiki Kaisha, Tokyo, Japan

[21] Appl. No.: 567,051

[22] Filed: Aug. 14, 1990

[30] Foreign Application Priority Data

Aug. 25, 1989 [JP] Japan .................................. 1-218847

[51] Int. Cl.⁵ .............................................. H04N 7/18
[52] U.S. Cl. ..................................... 358/108; 358/105
[58] Field of Search ....................... 358/107, 108, 105; 382/22

[56] References Cited

U.S. PATENT DOCUMENTS 4,908,704 3/1990 Fujioka et al. ........................ 358/105
4,951,140 8/1990 Ueno et al. ........................... 358/105

Primary Examiner—Howard W. Britton
Assistant Examiner—Kim Yen Vu
Attorney, Agent, or Firm—Fleit, Jacobson, Cohn, Price, Holman & Stern

[57] ABSTRACT

A method and an apparatus for detecting the number of persons in which the differential pictures are converted into binary signals being affected neither by the color of the hair of the persons to be detected nor by the change in the intensity of illumination even when the contrast is small over the background floor. The shape of the picture is corrected, and the area of the picture becomes nearly uniform irrespective of the positions of the persons in the visual field of the TV camera. Moreover, a correlation value relative to the pattern of a predetermined size and a center of gravity of the picture are found while compressing the number of pixels, making it possible to detect the number of persons within a very short period of time maintaining high precision.

2 Claims, 5 Drawing Sheets

METHOD AND APPARATUS FOR DETECTING THE NUMBER OF PERSONS

BACKGROUND OF THE INVENTION

1. Field of the Invention

The present invention relates to a method and an apparatus for detecting the number of persons in a particular place such as in a building, in an underground mall or a like place by processing picture signals from a TV camera.

2. Description of the Prior Art

A method has been widely employed according to which video signals of a TV camera are converted into digital signals, and a picture to be detected is recognized from the thus obtained digital signals. FIG. 3 is a block diagram showing a conventional apparatus for detecting the number of persons, wherein reference numeral 1 denotes a picture input unit which consists of a TV camera or the like and which takes a picture of persons to be detected and produces picture signals, reference numeral 2 denotes a preprocessing unit which receives picture signals from the picture input unit 1, removes noise components, converts them into binary signals and produces binary picture signals, 3 denotes an object pick-up unit which receives picture signals from the preprocessing unit 2 and picks up a picture of persons to be detected, 4 denotes an area comparator unit which compares the picture of persons picked up by the object pick-up unit 3 with a reference area picture that has been input and stored therein in advance, and reference numeral 5 denotes a counter unit which counts a picture that is greater than the reference area picture.

The operation will now be described. The picture input unit 1 takes a picture of a particular place such as in a building or in an underground mall and produces picture signals. The preprocessing unit 2 receives the picture signals, removes noise components through masking, and converts them into binary picture signals. The object pick-up unit 3 picks up a picture of persons to be detected from the binary picture signals. The area comparator unit 4 compares a reference area picture which has been stored therein in advance with the picture of persons to be detected picked up by the object pick-up unit 3, in order to obtain pictures of persons of portions greater than the reference area picture. The counter unit 5 counts these pictures and produces number-of-persons signals.

As mentioned above, the picture signals from the picture input unit are digitized in order to detect the number of persons to be detected.

According to the above-mentioned conventional apparatus for detecting the number of persons which determines the areas based upon the binary picture signals, however, the picture area (number of pixels or picture elements) of persons to be detected becomes so small as to make the detection difficult when the contrast over the background is small, such as when the hair is blond and the background floor has similar color. Due to a change in the intensity of illumination in a place where the picture input unit is installed, furthermore, it is difficult to set a threshold value when the signals are to be converted into binary signals. When the persons to be detected are imaged by the TV camera hanged from the ceiling, furthermore, the picture area becomes small at the center and becomes great toward the periphery to deteriorate the accuracy of detection. Moreover, when the picture signals are digitized to detect the number of persons, a problem arises with regard to the processing time; i.e., the processing becomes longer with an increase in the degree of processing.

SUMMARY OF THE INVENTION

An object of the present invention is to provide an improved apparatus for detecting the number of persons.

Another object of the present invention is to provide a new method of detecting the number of persons.

Another object of the present invention is to provide an apparatus for detecting the number of persons without being affected by the color of the hair or by the change in the intensity of illumination.

A further object of the present invention is to provide an apparatus for detecting the number of persons with in a very short period of time.

Another object of the present invention is to provide a new apparatus for detecting the number of persons with high accuracy.

Another object of the present invention is to provide an apparatus for detecting the number of persons which is not affected by the color of the hair or by the change in the intensity of illumination, and which is capable of detecting the number of persons within very short periods of time maintaining high precision.

The apparatus for detecting the number of persons according to the present invention comprises a differential picture operation unit which continuously receives picture from a TV camera maintaining a predetermined time interval, finds an absolute value of a difference between the two consecutive pictures and converts it into a binary signal, a shape correcting unit which nearly make it uniform the area where persons to be detected are imaged irrespective of a distance from the TV camera, a pixel number compression unit that shortens the time for processing the pictures, a correlation value detecting unit which scans a pattern of a predetermined size and finds a correlation between the pattern and the picture, and a center-of-gravity detecting unit which detects the center of gravity of a partial picture that is obtained by removing a picture included in said pattern which has a peak correlation value as a center.

The method of detecting the number of persons according to the present invention comprises the steps of:

(1) receiving the pictures consecutively from a TV camera maintaining a predetermined time interval, finding an absolute value of a difference between the two consecutive pictures, and converting a differential picture thereof into a binary picture with a threshold value that is capable of removing background noise in order to take out only a portion of the picture that has changed with the laps of time (i.e., portion where a person has moved), (2) correcting the shape of a picture, (3) combining a plurality of pixels into one to decrease the number of pixels and to shorten the processing time for detecting the number of persons, (4) scanning the pattern of the size of a person on the picture of which the number of pixels has been compressed in order to find a correction value between the pattern and the picture, (5) detecting the number of persons relying upon the peaks in the correlation value between the patterns and the pictures, scanning on the pictures the same patterns as those of when the correlation values are found based on the remaining partial pictures in order to find centers of gravity of the pictures in the patterns, finding those centers of gravity that are nearly in agreement with the centers of the patterns, counting the centers of gravities while suitably weighting them depending upon the distances relative to the positions of persons already detected, and removing pictures included in the patterns that have the counted centers of gravity as centers, and (6) adding up together the correlation values between the persons and the patterns and the number of persons counted based upon the centers of gravity.

In the present invention, the differential pictures is converted into binary signals and is affected neither by the color of the hair of the persons to be detected nor by the change in the intensity of illumination even when the contrast is small over the background floor. Furthermore, since the shape of the picture is corrected, the area of the picture becomes nearly uniform irrespective of the positions of the persons in the visual field of the TV camera. Moreover, a correlation value relative to a pattern of a predetermined size and a center of gravity of the picture are found while compressing the number of pixels. This makes it possible to detect the number of persons within a very short period of time maintaining high precision.

DESCRIPTION OF THE PREFERRED EMBODIMENT

An embodiment of the present invention will now be described in conjunction with the drawings.

Figure 1:
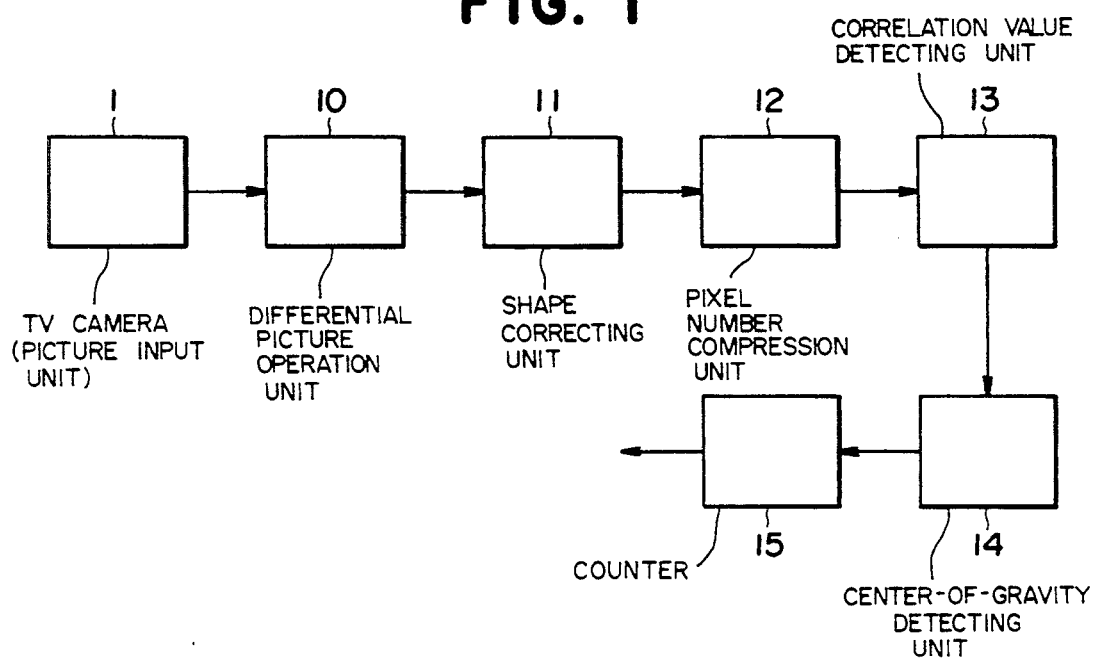
FIG. 1 is a block diagram illustrating the constitution of an apparatus for detecting the number of persons according to an embodiment of the present invention.
Figure 3:
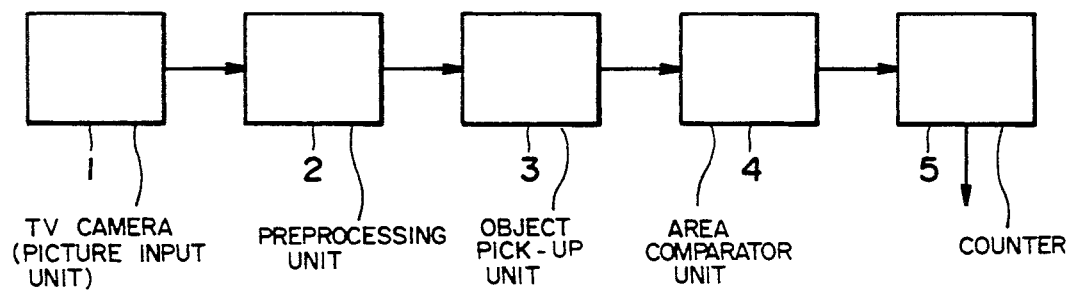
FIG. 3 is a block diagram illustrating the constitution of a conventional apparatus for detecting the number of persons.

FIG. 1 is a block diagram illustrating the constitution of an apparatus for detecting the number of persons according to the present invention, wherein the same portions as those of FIG. 3 (Prior Art) are denoted by the same reference numerals but are not described here again.

A differential picture operation unit 10 continuously receives pictures from the TV camera maintaining a predetermined time interval (e.g., 0.1 second), and finds absolute values of differences between the two consecutive pictures, and then converts the differential pictures into binary signals with a threshold value that is capable of removing background noise, in order to obtain a change of picture with the lapse of time, i.e., to obtain only those portions of persons who have moved. The differential pictures are obtained in principle by the movement of the persons. Therefore, stiffly standing persons who are completely at rest cannot be detected. In practice, however, such a condition never happens.

Reference numeral 11 denotes a shape correcting unit. The shape and area of persons to be detected vary depending upon the positions in the visual field of the TV camera. That is, a person standing at the center of the TV camera (center of the screen) has his head imaged and persons standing in the periphery have their whole body imaged oblongly. In order to make it nearly constant the picture areas in which the persons are imaged, therefore, the picture areas in the periphery of the screen are compressed by the shape correcting unit 11 in order to correct the shape of the pictures. Described below is a specific method of correcting the shape.

If now the distances between a pixel on the screen and the center of the screen before and after the correction of shape are denoted by $r$ and $r'$, respectively, a relationship between $r$ and $r'$ can be expressed as $r = r' \times f(r)$, where $f(r)$ is a correction coefficient for the distance from the center of the screen before the correction. If the correction coefficient $f(r)$ is a linear equation of $r$, there is obtained $f(r) = r_0 \times (1 + k \times r)$, where $r_0$ and $k$ are constants, $r_0$ is a correction coefficient at the center of the screen, and $k$ is a compression factor toward the center. The compression factor increases with an increase in this value. Reverting to FIG. 1, reference numeral 12 denotes a pixel number compression unit which combines a plurality of pixels (picture elements) into one to decrease the number of pixels and to shorten the processing time for detecting the number of persons. For instance, the initial number of pixels $250 \times 250$ on the screen in compressed to about $20 \times 20$ pixels.

A correlation value detecting unit 13 scans the pattern (e.g., $3 \times 3$ pixels) of a size of a person with the pixel as a unit on the screen where the number of pixels is compressed in order to find a correlation value between the pattern and the picture. That is, values (0 or 1) in the pattern are multiplied by pixel values (0 or 1) of the picture at the overlapping positions, and these values are added to the whole pattern, and the resulting values are regarded to be correlation values of pixels at the centers of the patterns. Then, the correlation values become great at positions where the pattern and the shape of picture of person come in good agreement with each other. The number of peaks having particularly great values are counted among the peaks of these correlation values. When a plurality of peaks are detected within short distances, these peaks are combined into one, followed by the removal of picture included in the patterns with the counted peaks as centers.

Reference numeral 14 denotes a center-of-gravity detecting unit. When the movement is small or when the contrast is small over the background, there is obtained a differential picture having a small area and the correlation value becomes small relative to the pattern of a person. Therefore, it becomes difficult to detect the persons using peaks of correlation values. To cope with this, therefore, the number of persons is detected by the correlation value detecting unit 13 based on the peaks of correlation values relative to the patterns, the patterns same as the patterns of when the correlation values were found are scanned on the pictures relying upon the remaining partial pictures to find the centers of gravity of the pictures in the patterns. Then, the centers of gravity that are nearly in agreement with the centers of patterns are found out of the centers of gravity, and the thus found centers of gravity are counted after being suitably weighted (greater than 0 but smaller than 1) depending upon the distances relative to the positions of persons detected. Thereafter, pictures are removed that are included in the patterns that have the counted centers of gravity as centers.

The number of persons counted based on the correlation values relative to the patterns of persons and the centers of gravity is summed up by a counter unit 15.

Figure 2A:
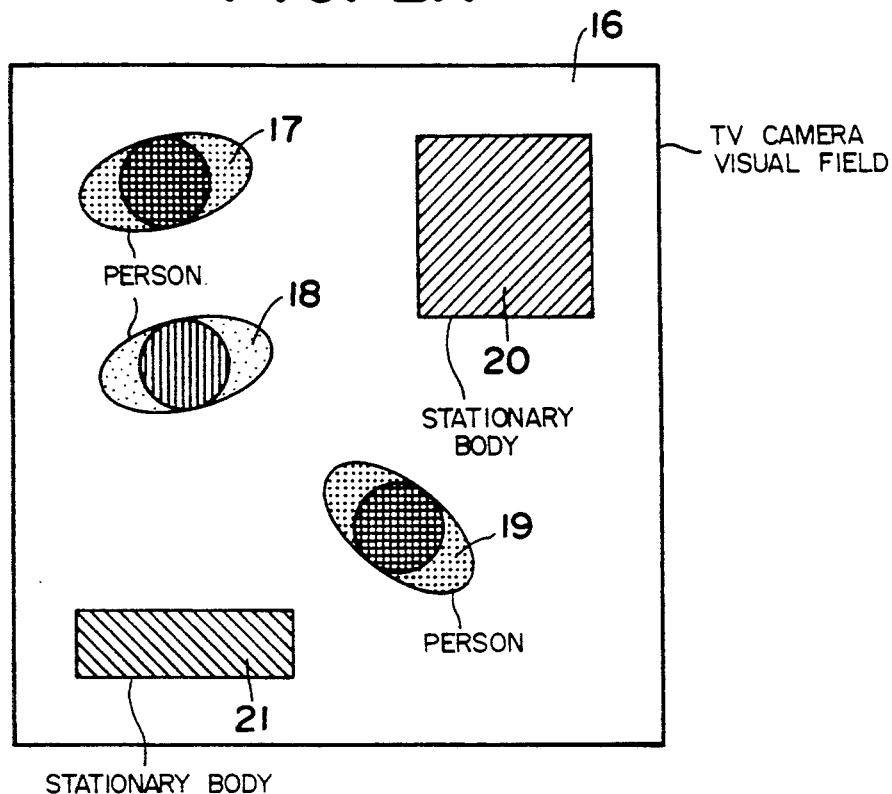
FIG. 2(a) to 2(h) are diagrams of processed pictures for explaining the processing operations of the blocks of FIG. 1.
Figure 2B:
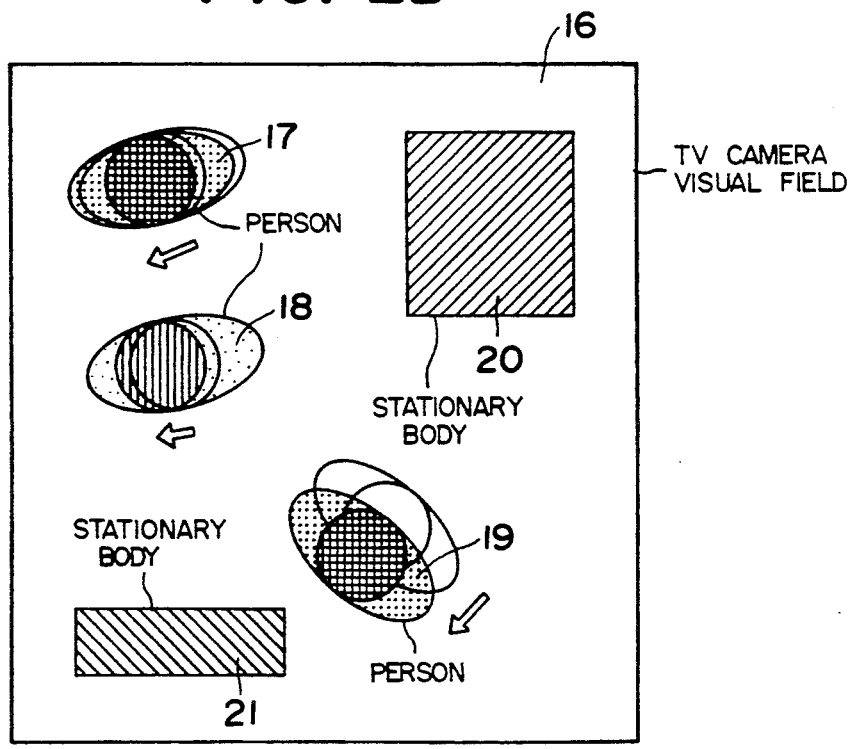
Figure 2C:
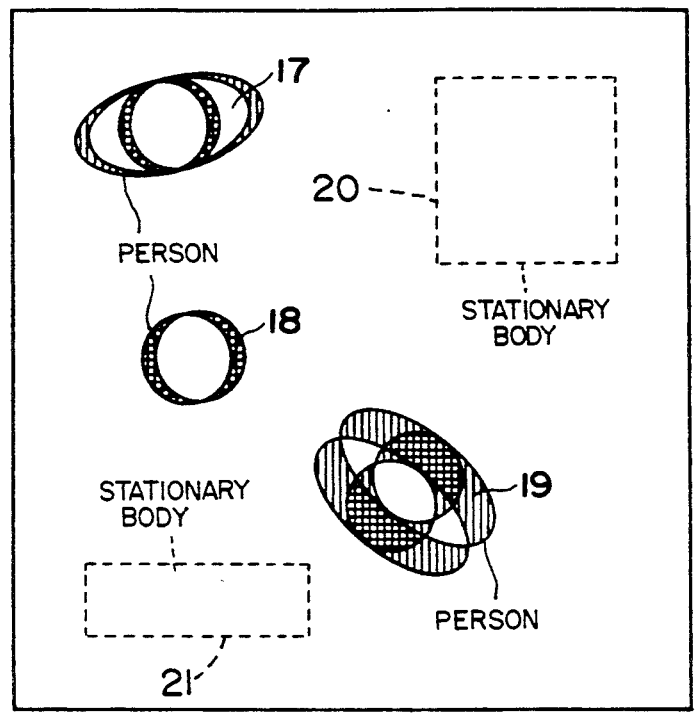
Figure 2D:
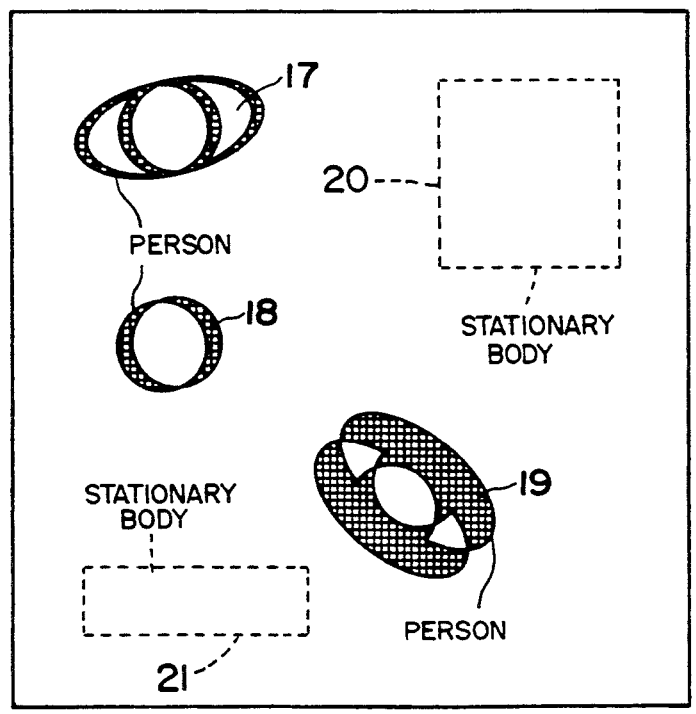

Processing operations of the blocks of FIG. 1 will now be described with reference to processed pictures of FIG. 2A to 2H which are diagrams showing the processed pictures in each of the processing units. FIG. 2A shows a first picture of the two consecutive pictures received by the differential picture operation unit 10, wherein reference numeral 16 denotes the visual field of a TV camera, reference numerals 17, 18 and 19 denote individual persons, and reference numerals 20 and 21 denote different stationary material bodies. FIG. 2B shows a second picture of the above two consecutive pictures, wherein the persons 17 and 19 are moving more than the person 18. The person 18 is moving his head only. On the other hand, positions of the stationary material bodies 20 and 21 remain unchanged. FIG. 2C shows differential pictures illustrating absolute values of differences of pictures between FIG. 2A and FIG. 2B. Changing quantities of the persons 17, 18 and 19 appear as processed pictures, and the stationary material bodies 20 and 21 whose positions remain uncharged do not appear as processed pictures. FIG. 2D shows binary picture converted from the differential pictures with threshold values capable of removing background noise. The differential picture operation unit 10 performs the processing from FIG. 2A up to FIG. 2B.

Figure 2E:
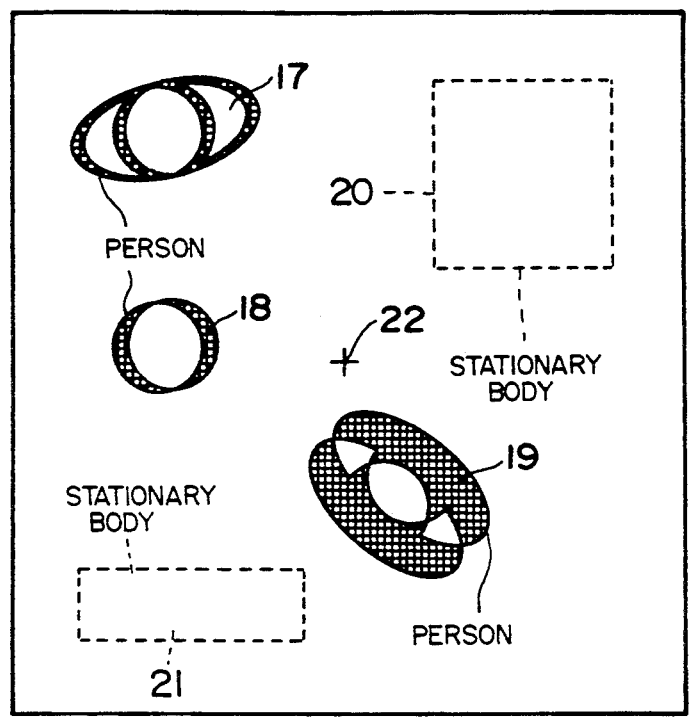
Figure 2F:
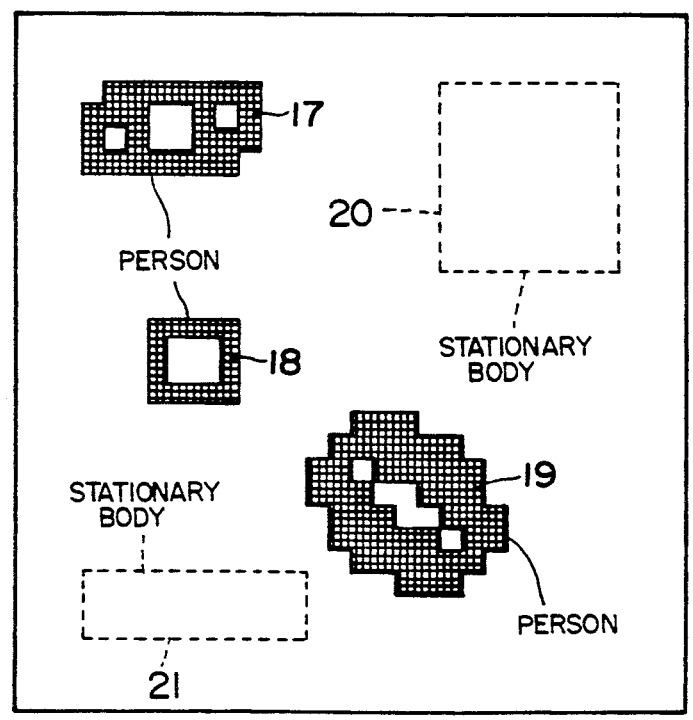

FIG. 2E shows pictures processed by the shape correcting unit 11. The person 17 is compressed since he has a greater distance from the center 22 of the visual field of the TV camera than the persons 18 and 19. FIG. 2F shows compressed pictures having reduced number of pixels obtained by combining into one the plurality of pixels of the processed picture of FIG. 2E.

Figure 2G:
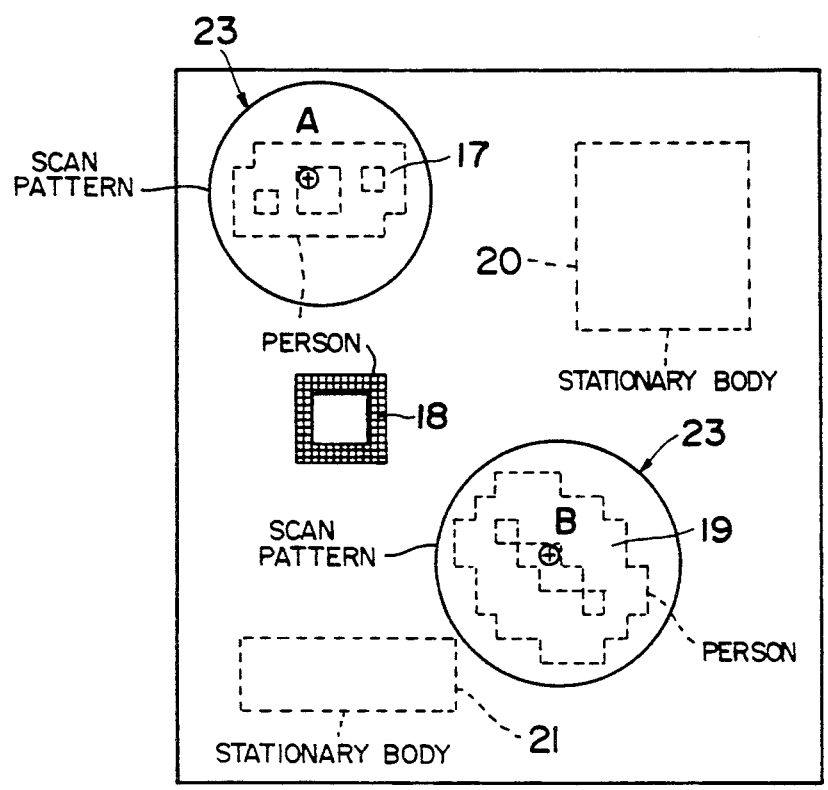

Processing by the correlation value detecting unit 13 will now be described in conjunction with FIG. 2G, wherein reference numeral 23 denotes patterns which are scanned on the pixel number-compressed pictures to find correlation values relative to the picture. Peak correlation values (indicated by A+ and B+ in the drawing) are counted, and pictures (compressed pictures of persons 17 and 19 in the drawing) included in the patterns 23 are removed. The picture of the person 18 has a small correlation value relative to the patterns 23 of persons, and is not counted.

Figure 2H:
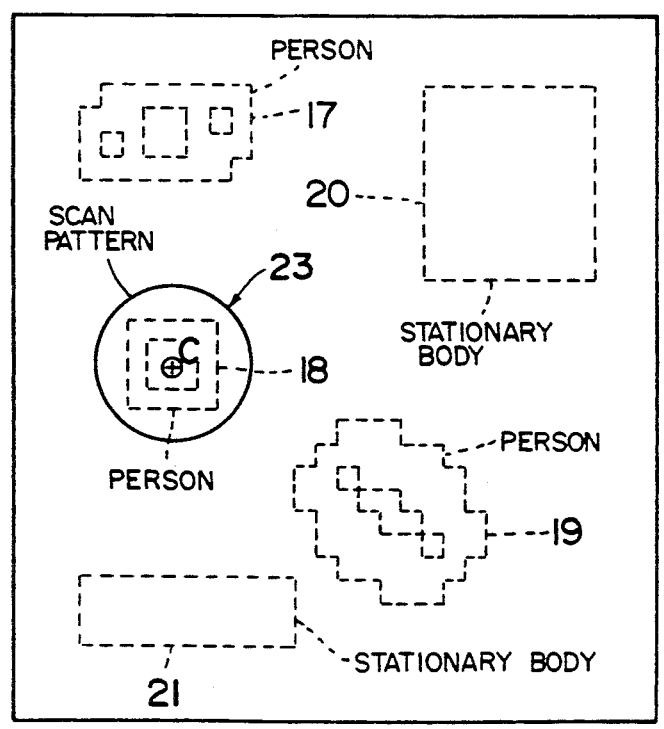

Next, the processing by the center-of-gravity detecting unit 14 will be described in conjunction with FIG. 2H. The picture left through the processing by the correlation value detecting unit 13 is scanned using the same pattern 23 as the one when the correlation values were found, in order to find a center of gravity of the picture in the pattern 23 and to find the one (indicated by C+ in the drawing) that is nearly in agreement with the center of the pattern. The center of gravity is then counted being suitably weighted (1.0 in this case) depending upon the distances between the center of gravity C+ and the positions (A+ and B+ in the drawing) of the persons detected already, and then the picture (compressed picture of the person 18) included in the pattern 23 is removed. The counter unit 15 adds up together the value (2 in this case) counted by the correlation value detecting units 13 and the value (1.0 in this case) counted by the center-of-gravity detecting unit 14 in order to obtain a detected value of three persons.

According to the present invention as described above, the number of persons can be detected very precisely and within short periods of time irrespective of the color of the hair or clothes of the persons to be detected no matter how small the contrast is over the background floor, or irrespective of the change in the intensity of illumination or the positions of the persons in the visual field of the TV camera.

What is claimed is:

1. An apparatus for detecting the number of persons by processing the picture signals from a TV camera, comprising:

a differential picture operation unit for converting an absolute value of a difference between two consecutive pictures from said TV camera into a binary value;

a shape correcting unit for correcting an area of the picture depending upon a distance between a center of said TV camera and a picture of a person to be detected;

a pixel number compression unit for decreasing the number of pixels by combining a plurality of pixels into one;

a correlation value detecting unit for scanning a pattern of a predetermined size with the pixel of picture produced from said pixel number compression unit as a unit to thereby find a correlation value between said pattern and said picture that is produced; and a center-of-gravity detecting unit for detecting the center of gravity of a partial picture in said pattern, wherein said partial picture is obtained by removing the picture included in said pattern that has a peak of said correlation value as a center.

2. A method of detecting the number of persons comprising the steps of:

(1) receiving the pictures consecutively from a TV camera maintaining a predetermined time interval, finding an absolute value of a difference between two consecutive pictures, and converting a differential picture thereof into a binary picture with a threshold value, wherein said threshold value is capable of removing background noise to take out only a portion of the picture that has changed with the lapse of time, (2) correcting the shape of a picture;

(3) combining a plurality of pixels into one, thereby decreasing the number of pixels and shorting the processing time for detecting the number of persons, (4) scanning the pattern of the size of a person on the picture, wherein the number of pixels has been compressed on said picture to thereby find a correlation value between the pattern and the picture, (5) detecting the number of persons relying upon peaks in the correlation values between the patterns and the pictures, scanning on the pictures the same patterns as those of when the correlation values were found based on the remaining partial pictures to thereby find centers of gravity of the pictures in the patterns, finding those centers of gravity that are nearly in agreement with the centers of the patterns, counting the centers of gravities while suitably weighting the counted centers of gravities depending upon the distances relative to the positions of persons already detected, and removing pictures included in the patterns having counted centers of gravities as centers, and (6) adding up together the correlation values between the persons and the patterns and the number of persons counted based on the centers of gravities.

* * * * *